W. H. HEULINGS, Jr.
CAR TRUCK.
APPLICATION FILED JAN. 2, 1913.
1,074,322.
Patented Sept. 30, 1913.
2 SHEETS—SHEET 2.
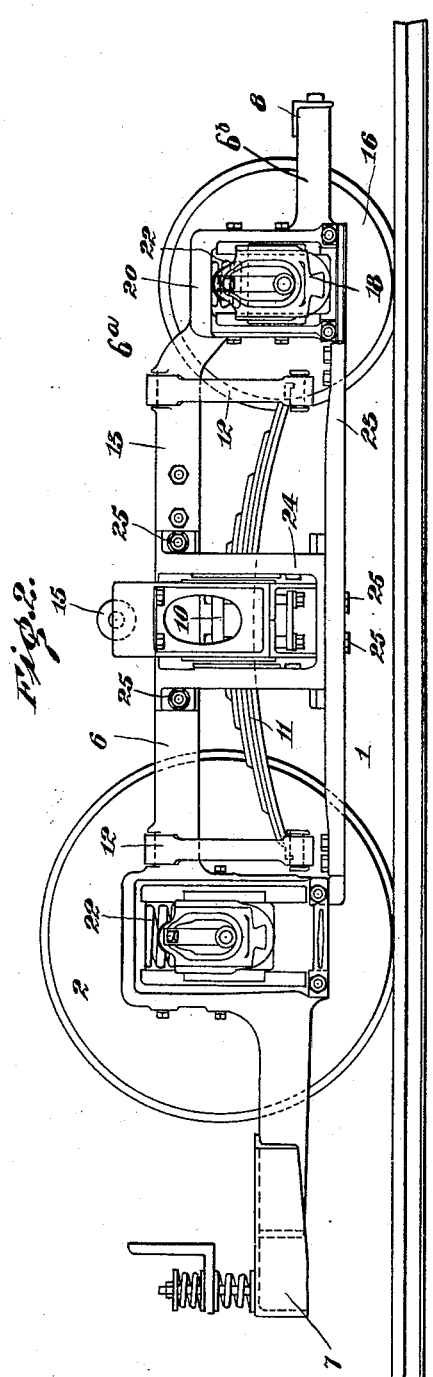
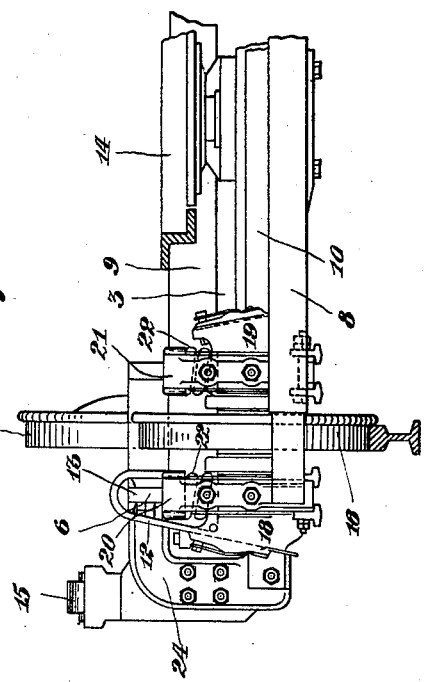
Witnesses:
C. S. Ashley
J. J. Donohue
Inventor
William H. Heulings, Jr.
By his Attorney
Joseph R. Levy

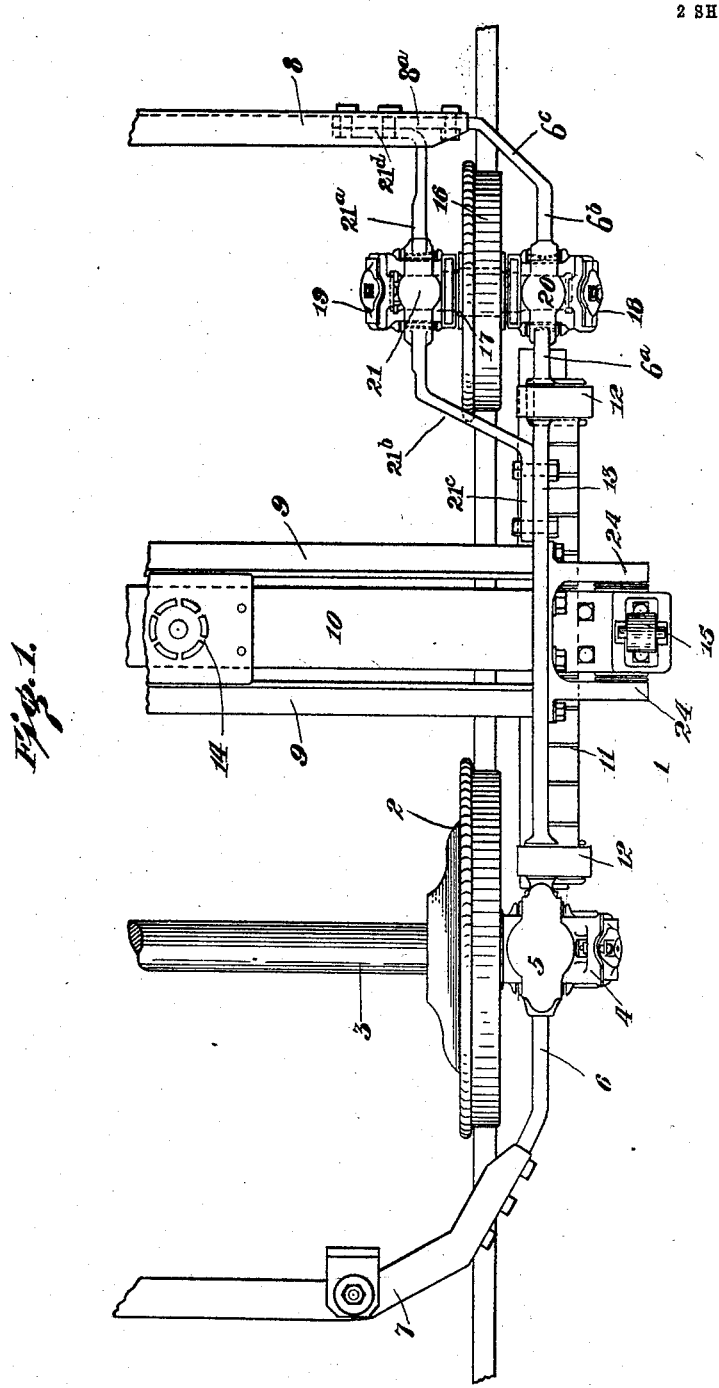

UNITED STATES PATENT OFFICE.

WILLIAM H. HEULINGS, JR., OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,074,322.  Specification of Letters Patent.  Patented Sept. 30, 1913.

Application filed January 2, 1913. Serial No. 739,586.

*To all whom it may concern:*

Be it known that I, WILLIAM H. HEULINGS, Jr., a citizen of the United States, and a resident of the city and county of Philadelphia, State of Pennsylvania, and whose post-office address is care of The J. G. Brill Co. at Sixty-second street and Woodland avenue, in said city, have invented a new and useful Improvement in Car-Trucks, of which the following is a specification.

The object of my invention is to provide a suitable truck for low hung cars, such as a stepless car, in which the floor is designed to lie within an easy "step-up" from the road bed, which truck will radiate properly and not in any way interfere with the body of the car when in use.

The improvements herein described are specially designed for use in connection with what is called a maximum-traction truck, in which large driving wheels and smaller so-called trailing wheels and an eccentrically placed pivot are used.

In many cases it is desirable to locate the floor of the entrance platform, as above stated, very near the road-bed, so as to avoid the use of the usual plurality of steps, and the present trend of surface car building is to increase the longitudinal dimensions of the platform, in order to facilitate the handling of traffic under pre-payment systems of fare collection. The improvements herein set forth enable me to provide means for an efficient support of the car body under the platform. By so placing the truck that the smaller or so-called trailing wheels lead, and by eliminating the usual cross axle for these wheels, the platform can be hung very low and the truck radiate under the platform without interference.

My invention, therefore, consists in the construction and combination of parts hereinafter described, and finally pointed out in the claims appended hereto.

Figure 1 is a plan view of half a truck embodying my invention, the other half which is not shown corresponds to what is shown. Fig. 2 is a side elevation of the structure shown in Fig. 1. Fig. 3 is an end elevation of the same.

In the drawing forming part of this specification, similar numerals of reference indicate similar parts throughout the several views.

My improved truck may have a usual form of construction, in its general organization, or be otherwise constructive. As shown the truck 1 has driving wheels 2 mounted on a suitable axle 3 which is journaled in axle boxes 4 mounted in the pedestals 5 of the side frames 6. The side frames 6 are kept in alinement by the usual end crossings 7 and 8 and transoms 9 and carry a bolster 10 which is swung from upwardly arched semi-elliptic springs 11 which are suspended by outwardly splayed links 12 from the top chords 13 of the frames, 6, as shown. For reasons that will appear below it is important that the side frames 6 be sturdy and strong and well braced and connected so as to keep their proper alinement. The bolster 10 is provided with a center bearing 14 located nearer the driving wheels, and side bearings 15 which may be of any suitable design.

The trailing wheels 16 are mounted on stud axles 17, one wheel to each axle, and each axle 17 has two axle boxes 18 and 19, the axle box 18 being mounted in a pedestal 20 of the side frame 6 and the axle box 19 in a supplemental pedestal 21 fixed by bolts to the top chord 13 and the crossing 8, and is preferably shaped as shown so as to be sufficiently rigid and yet not to interfere either with the operation or looks of the truck. The axle boxes 4, 18 and 19 are surmounted by suitable axle box springs 22, which separate them from their respective pedestals. The pedestals 4 and 20 in each side frame 6 are connected by suitable tie bar 23 which is also connected to the top chord 13 by suitable braces and guides 24 and bolts 25.

The supplemental pedestals for the inner ends of the stud-axles 17 are each secured to supplemental frames $21^a$, the major portion of each of which is parallel with the extended portion $6^a$ of the side frame or upper chord and the extensions $6^b$ from the pedestals 20. The crossing 8 is secured to the transversely disposed part $8^a$ of the extension $6^b$, the two being united by the angularly disposed part $6^c$. The supplemental frames $21^a$ are provided with an angularly disposed branch $21^b$ extending toward the bolster and a branch $21^c$ parallel with the side bar 13 and to which it is secured by bolts, and another angular extension $21^d$ secured to the end $8^a$ of the side bar extension $6^b$. This construction, especially as the parts can all be made out of one forged piece of metal, affords a very economical manner of supporting the supplemental pedestals and axle boxes, and enables the parts to be expeditiously and firmly secured to the truck frame.

The axles 17 are shaped so as to fit in the axle boxes 18 and 19 so as to prevent excessive end play and keep the wheels 16 in proper alinement. For this purpose the axles 17 are provided with collars at the ends of the axle, as shown in dotted lines.

It will be noted that when a car body of the stepless type is mounted on trucks of the character above described, the axles 17 will not interfere with the car floor no matter how low it is carried and the axle boxes 19 may be so placed as to be under a part of the car body which is raised above the floor. The result is that this truck permits a car body to be hung low and operates in other respects as an ordinary truck.

I claim:

1. In a truck, the combination with a truck frame, driving wheels and smaller trailing wheels, a pivot located nearer the driving than the trailing wheels, inside supplemental frames attached to the trailing wheel ends of the truck frame, opposing axle-boxes secured to the truck frame and to the supplemental frames, and stud axles carrying the trailing wheels supported by the axle boxes in the truck and supplemental frames.

2. In a truck of the class described, side frames and means connecting the same to keep them in alinement, supplementary pedestals secured to said side frames, axle boxes and means for supporting the side frames and supplemental frames therefrom, an axle with driving wheels and stud axles with trailing wheels mounted between said side frames and supplemental pedestals.

3. In a truck of the class described, the combination with side frames, axles and driving wheels thereon mounted in axle boxes held in pedestals at one end of the frame, and smaller or trailing wheels mounted on stud axles the outer ends of which enter journal boxes mounted in pedestals at the other end of the frame, a pivot plate mounted on a bolster eccentrically placed with relation to the driving wheels, a crossing securing the side frames together adjacent the driving wheels, extensions 6$^b$ from the outer pedestal of the trailing-wheel studaxles, a crossing 8 secured to the extensions 6$^b$, and supplemental frames carrying pedestals for the inner axle-boxes for the said stud-axles secured at one end to the end crossing and at the other end to the side frames.

4. In a car truck, stud axles each having a wheel thereon, axle boxes adjacent the ends of the stud-axles, and a frame for securing the axle-boxes in position and in alinement comprising side-frames having pedestals 20 and extensions therefrom, a crossing securing the side-frame extensions together, and supplemental frames 21$^a$ having extensions 21$^d$ secured to the crossing, an extension 21$^c$ secured to the side-frame, and an angular extension 21$^b$ connecting the supplemental frame 21$^a$ and its extension 21$^c$.

Signed at the city and county of Philadelphia and State of Pennsylvania, this 30th day of December, 1912.

WM. H. HEULINGS, Jr.

Witnesses:
HENRY C. ESLING,
H. F. McKILLIP.

---

Copies of this patent may be obtained for five cents each, by addressing the "Commissioner of Patents, Washington, D. C."